US 12,244,471 B2

(12) United States Patent
Bieniek et al.

(10) Patent No.: US 12,244,471 B2
(45) Date of Patent: Mar. 4, 2025

(54) EASY DSL SIGNAL DETECTOR

(71) Applicant: CenturyLink Intellectual Property LLC, Broomfield, CO (US)

(72) Inventors: Anthony M. Bieniek, Centennial, CO (US); Brian E. Bond, Fairmont, WV (US)

(73) Assignee: CenturyLink Intellectual Property LLC, Denver, CO (US)

( * ) Notice: Subject to any disclaimer, the term of this patent is extended or adjusted under 35 U.S.C. 154(b) by 169 days.

(21) Appl. No.: 17/671,940

(22) Filed: Feb. 15, 2022

(65) Prior Publication Data

US 2023/0119055 A1  Apr. 20, 2023

Related U.S. Application Data

(60) Provisional application No. 63/255,770, filed on Oct. 14, 2021.

(51) Int. Cl.
*H04L 41/50* (2022.01)
*H04M 3/30* (2006.01)

(52) U.S. Cl.
CPC ............ *H04L 41/50* (2013.01); *H04M 3/30* (2013.01)

(58) Field of Classification Search
CPC .................................. H04L 41/50; H04M 3/30
USPC ........................................................... 379/21
See application file for complete search history.

(56) References Cited

U.S. PATENT DOCUMENTS

| 4,568,802 A * | 2/1986 | Bradley ............... H04B 3/46 379/22 |
| 6,292,468 B1 * | 9/2001 | Sanderson ............. H04M 3/30 370/241 |
| 6,298,118 B1 * | 10/2001 | Liggett ................ H04M 3/308 379/27.02 |
| 6,891,803 B1 * | 5/2005 | Chang ................. H04M 11/062 348/192 |
| 6,970,534 B1 * | 11/2005 | Brumble ............... H04M 3/308 379/19 |
| 7,003,078 B2 * | 2/2006 | Starr .................... H04M 3/306 379/1.04 |
| 7,729,476 B2 * | 6/2010 | Wollmershauser ..... H04M 1/24 379/1.04 |
| 2003/0174812 A1 * | 9/2003 | Chen ...................... H04L 1/243 370/251 |
| 2005/0047555 A1 * | 3/2005 | Kurth .................... G01R 31/08 379/29.01 |
| 2007/0047664 A1 * | 3/2007 | Schley-May ....... H04L 25/0266 375/220 |

(Continued)

*Primary Examiner* — Binh Kien Tieu

(57) ABSTRACT

Novel tools and techniques are provided for implementing easy digital subscriber line ("DSL") signal detection. In various embodiments, after a connector of a signal detector has been inserted into a network service port, a processor of the signal detector may determine whether a pilot tone is present on at least one signal wire communicatively coupled to the network service port, the pilot tone being indicative of network service being ready for provision via the at least one signal wire. If so, the processor of the signal detector may cause a display device to indicate to a user that the network service port is ready to provide the network service. A modem can then be installed by connecting with the network service port. The connector, the processor, and the display device are integrated within a single, compact, handheld form factor of the signal detector.

16 Claims, 8 Drawing Sheets

(56) References Cited

U.S. PATENT DOCUMENTS

2010/0074415 A1* 3/2010 Knudson ............... H04M 3/308
379/21

* cited by examiner

EASY DSL SIGNAL DETECTOR

CROSS-REFERENCES TO RELATED APPLICATIONS

This application claims priority to U.S. Patent Application Ser. No. 63/255,770 (the "'770 Application"), filed Oct. 14, 2021, by Anthony M. Bieniek et al., entitled, "Easy DSL Signal Detector," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing Internet service provisioning, and, more particularly, to methods, systems, and apparatuses for implementing easy digital subscriber line ("DSL") signal detection.

BACKGROUND

When provisioning Internet service (e.g., digital subscriber line ("DSL")-based Internet service, or the like) to a customer premises, conventional approaches require a truck roll so that a technician can enter the customer premises to use (costly) professional testing equipment to identify which network service port (e.g., DSL cable port, or the like) within the customer premises is communicatively coupled to the service provider's network via a digital subscriber line access multiplexer ("DSLAM") and a minimum point of entry ("MPOE") (which is affixed to an exterior wall of the customer premises). Not only does the truck roll incur costs to the service provider, but the professional testing equipment also incurs costs, and the customer may be inconvenienced by the entire process. The dispatching of technicians into the customer premises of customers for modem (or network service) installation in this manner is also inefficient when scaled for a large number of similar customers requiring modem (or network service) installation, not to mention the fuel and equipment costs associated therewith, as well as the customer inconvenience factor.

Hence, there is a need for more robust and scalable solutions for implementing Internet service provisioning, and, more particularly, to methods, systems, and apparatuses for implementing easy digital subscriber line ("DSL") signal detection.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
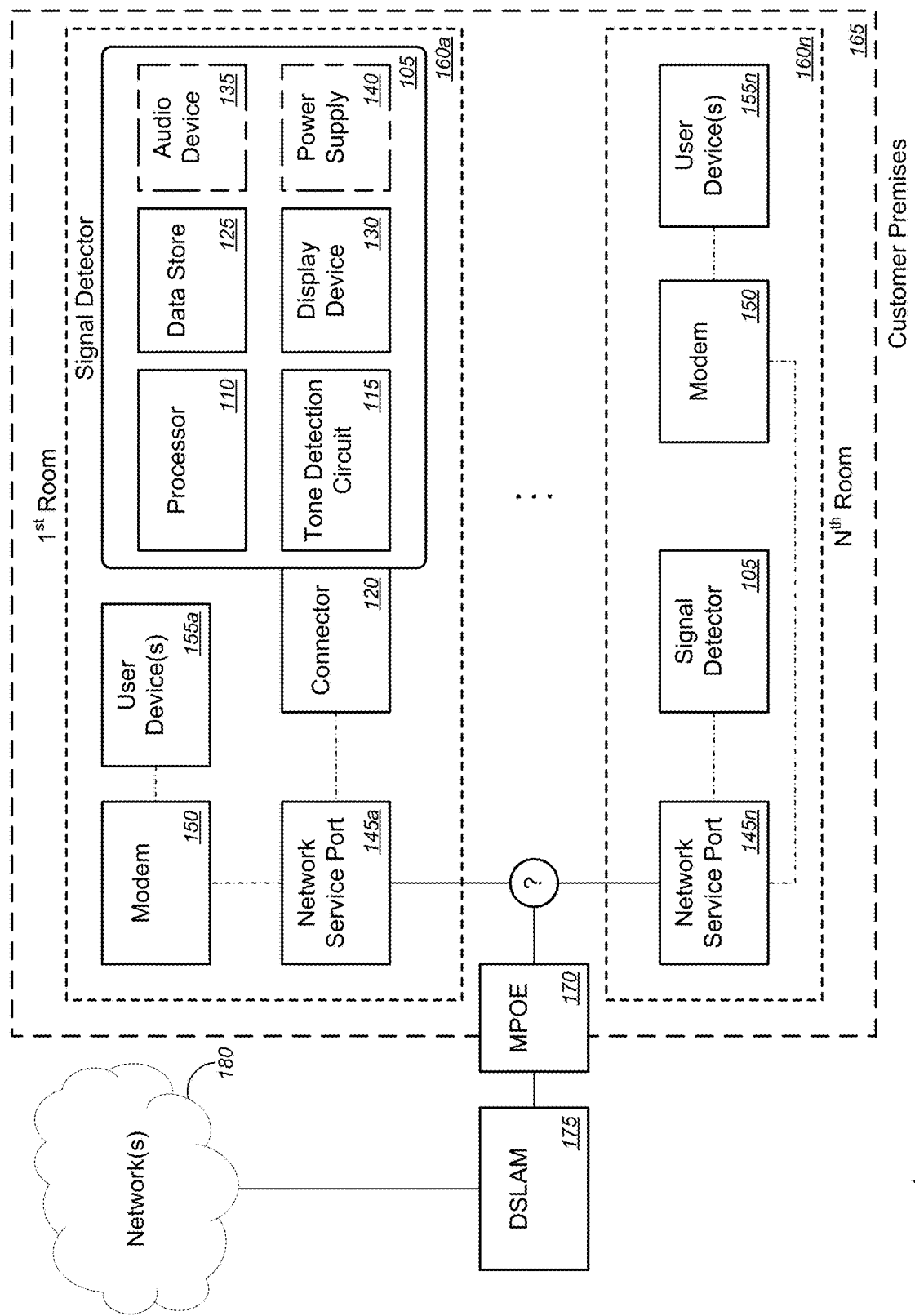
FIG. 1 is a schematic diagram illustrating a system for implementing easy digital subscriber line ("DSL") signal detection, in accordance with various embodiments.

Various embodiments provide tools and techniques for implementing Internet service provisioning, and, more particularly, to methods, systems, and apparatuses for implementing easy digital subscriber line ("DSL") signal detection.

In various embodiments, after a connector of a signal detector has been inserted into a network service port, a processor of the signal detector may determine whether a pilot tone is present on at least one signal wire communicatively coupled to the network service port, the pilot tone being indicative of network service being ready for provision via the at least one signal wire. Based on a determination that a pilot tone is present on at least one signal wire communicatively coupled to the network service port, the processor of the signal detector may cause a display device to indicate to a user that the network service port is ready to provide the network service.

According to some embodiments, the network service may be a digital subscriber line ("DSL") service, the connector may be a DSL-compatible connector, and the network service port may be a DSL-compatible port. In such cases, the pilot tone may comprise a 138 kHz center-frequency signal.

Once the network service port among a plurality of network service ports has been identified as being ready to provide network service (based on presence of the pilot tone indicative of such), the user may install or connect a modem. The modem may then be trained up or connected, via appropriate handshake sequence with a digital subscriber line access multiplexer ("DSLAM") or other network equipment in the network via a minimum point of entry ("MPOE") device that is affixed to an exterior wall of the customer premises. Once trained up or connected, the modem may be communicatively coupled (via either wired or wireless connection) to one or more user devices within the customer premises.

The connector, the processor, and the display device (among other components of the signal detector) are integrated within a single, compact, handheld form factor of the signal detector. With such a form factor, the signal detector can be made to be low-cost, "plug-and-play" ready (i.e., may function immediately upon insertion in a compatible network service port, provided it has sufficient power), and easy to pick up and use (compared with costly and/or cumbersome devices whose results require interpretation by a user, such as oscilloscopes, professional technician's instruments, etc.). Accordingly, the signal detector may be provided to a customer along with the modem or other network equipment, with instructions for the customer to personally identify the correct network service port to connect or install the modem, without the need for a technician to enter the customer premises to install the modem. In this manner, the costs of the service may be reduced, as truck rolls for installing the modem within the customer premises may be obviated, as well as the need for expensive equipment for identifying the network service port for installing the modem (regardless of whether the customer or the technician is installing the modem).

These and other aspects of the easy DSL signal detector are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network provisioning technology, DSL-based network provisioning technology, modem installation technology, or DSL modem installation technology, and/or the like. In other aspects, certain embodiments, can improve the functioning of user equipment or systems themselves (e.g., network provisioning systems, DSL-based network provisioning systems, modem installation systems, or DSL modem installation systems, etc.), for example, by, after a connector of a signal detector has been inserted into a network service port, determining, using a processor of the signal detector, whether a pilot tone is present on at least one signal wire communicatively coupled to the network service port, the pilot tone being indicative of network service being ready for provision via the at least one signal wire; and based on a determination that a pilot tone is present on at least one signal wire communicatively coupled to the network service port, causing, using the processor of the signal detector, a display device to indicate to a user that the network service port is ready to provide the network service, wherein the connector, the processor, and the display device are integrated within a single, compact, handheld form factor of the signal detector; and/or the like. In particular, to the extent any abstract concepts are present in the various embodiments, those concepts can be implemented as described herein by devices, software, systems, and methods that involve specific novel functionality (e.g., steps or operations), such as, using a compact, handheld signal detector to detect which network service port in a customer premises to install a modem to provide network service to the customer premises based on detection (or lack of detection) of a pilot signal indicative of connection with Internet service via a DSLAM and a MPOE; and/or the like, to name a few examples, that extend beyond mere conventional computer processing operations. These functionalities can produce tangible results outside of the implementing computer system, including, merely by way of example, providing a low-cost, "plug-and-play" ready, and easy to pick up and use signal detector that is configured to easily determine the appropriate network service port to install a modem for providing network service, based on detection (or lack of detection) of a pilot tone in the network service port, and/or the like, at least some of which may be observed or measured by customers and/or service providers.

In an aspect, a method may comprise, after a connector of a signal detector has been inserted into a network service port, determining, using a processor of the signal detector, whether a pilot tone is present on at least one signal wire communicatively coupled to the network service port, the pilot tone being indicative of network service being ready for provision via the at least one signal wire; and based on a determination that a pilot tone is present on at least one signal wire communicatively coupled to the network service port, causing, using the processor of the signal detector, a display device to indicate to a user that the network service port is ready to provide the network service, wherein the connector, the processor, and the display device are integrated within a single, compact, handheld form factor of the signal detector.

In some embodiments, the signal detector may further comprise a tone detection circuit. The tone detection circuit may also be integrated within the single, compact, handheld form factor of the signal detector. In such cases, determining whether the pilot tone is present on the at least one signal wire communicatively coupled to the network service port may comprise: determining, using the tone detection circuit of the signal detector, whether a pilot tone is present on at least one signal wire communicatively coupled to the network service port; and based on a determination that a pilot tone is present on at least one signal wire communicatively coupled to the network service port, sending, using the tone detection circuit, a signal to the processor indicating that the pilot tone is present on the at least one signal wire. In some instances, the tone detection circuit may be configured to detect a signal having a 138 kHz center frequency. In some cases, the tone detection circuit may comprise a band-pass filter having a 3 dB passband roll-off on either side of the 138 kHz center frequency. In some cases, the processor may be integrated within the tone detection circuit.

According to some embodiments, the network service may be a digital subscriber line ("DSL") service, the connector may be a DSL-compatible connector, and the network service port may be a DSL-compatible port. In such cases, the pilot tone may comprise a 138 kHz center-frequency signal.

In some embodiments, the display device may comprise a multi-colored light emitting diode ("LED"). In some cases, a first color of the multi-colored LED may indicate that the network service port is ready to provide the network service, while a second color of the multi-colored LED may indicate that the network service is not provided through the network service port, where the second color may be different from the first color. In some instances, a third color of the multi-colored LED may indicate that the signal detector is powered on. In some cases, the third color and the second color may be the same color.

Alternatively, or additionally, the display device may comprise one or more single-colored LEDs. In some instances, a first single-colored LED, when turned on, may indicate that the network service port is ready to provide the network service. In some cases, a second single-colored LED, when turned on, may indicate that the network service is not provided through the network service port. In some instances, a color of the second single-colored LED may be different from a color of the first single-colored LED.

Alternatively, or additionally, the display device may comprise a liquid crystal display ("LCD"). In some cases, the LCD may display at least one of a first character, a first symbol, a first word, or a first icon to indicate that the network service port is ready to provide the network service, while the LCD may display at least one of a second character, a second symbol, a second word, or a second icon to indicate that the network service is not provided through the network service port. In some instances, each of the first character, the first symbol, the first word, and the first icon may be different from corresponding one of the second character, the second symbol, the second word, and the second icon.

In another aspect, a signal detector may comprise a connector; a display device; a processor; and a non-transitory computer readable medium communicatively coupled to the processor. The non-transitory computer readable medium may have stored thereon computer software comprising a set of instructions that, when executed by the processor, causes the signal detector to: after the connector of the signal detector has been inserted into a network service port, determine whether a pilot tone is present on at least one signal wire communicatively coupled to the network service port, the pilot tone being indicative of network service being ready for provision via the at least one signal wire; and based on a determination that a pilot tone is present on at least one signal wire communicatively coupled to the network service port, cause the display device to indicate to a user that the network service port is ready to provide the network service, wherein the connector, the processor, the display device, and the non-transitory computer readable medium are integrated within a single, compact, handheld form factor of the signal detector.

According to some embodiments, the signal detector may further comprise a tone detection circuit. The tone detection circuit may also be integrated within the single, compact, handheld form factor of the signal detector. In such cases, determining whether the pilot tone is present on the at least one signal wire communicatively coupled to the network service port may comprise: determining, using the tone detection circuit, whether a pilot tone is present on at least one signal wire communicatively coupled to the network service port; and based on a determination that a pilot tone is present on at least one signal wire communicatively coupled to the network service port, sending, using the tone detection circuit, a signal to the processor indicating that the pilot tone is present on the at least one signal wire. In some instances, the tone detection circuit may be configured to detect a signal having a 138 kHz center frequency. In some cases, the tone detection circuit may comprise a band-pass filter having a 3 dB passband roll-off on either side of the 138 kHz center frequency. In some instances, the processor may be integrated within the tone detection circuit.

In some embodiments, the network service may be a digital subscriber line ("DSL") service, the connector is a DSL-compatible connector, and the network service port may be a DSL-compatible port. In such cases, the pilot tone may comprise a 138 kHz center-frequency signal.

According to some embodiments, the display device may comprise a multi-colored light emitting diode ("LED"). In some cases, a first color of the multi-colored LED may indicate that the network service port is ready to provide the network service, while a second color of the multi-colored LED may indicate that the network service is not provided through the network service port, where the second color may be different from the first color. In some instances, a third color of the multi-colored LED may indicate that the signal detector is powered on. In some cases, the third color and the second color may be the same color.

Alternatively, or additionally, the display device may comprise one or more single-colored LEDs. In some instances, a first single-colored LED, when turned on, may indicate that the network service port is ready to provide the network service. In some cases, a second single-colored LED, when turned on, may indicate that the network service is not provided through the network service port. In some instances, a color of the second single-colored LED may be different from a color of the first single-colored LED.

Alternatively, or additionally, the display device may comprise a liquid crystal display ("LCD"). In some cases, the LCD may display at least one of a first character, a first symbol, a first word, or a first icon to indicate that the network service port is ready to provide the network service, while the LCD may display at least one of a second character, a second symbol, a second word, or a second icon to indicate that the network service is not provided through the network service port. In some instances, each of the first character, the first symbol, the first word, and the first icon may be different from corresponding one of the second character, the second symbol, the second word, and the second icon.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing Internet service provisioning, and, more particularly, to methods, systems, and apparatuses for implementing easy digital subscriber line ("DSL") signal detection, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing easy digital subscriber line ("DSL") signal detection, in accordance with various embodiments.

In the non-limiting embodiment of FIG. 1, system 100 may comprise a signal detector 105, which may include, without limitation, a processor 110, a tone detection circuit 115, a connector 120, a data store 125, a display device 130, an audio device 135 (optional), and a power supply 140 (optional).

Figure 2:
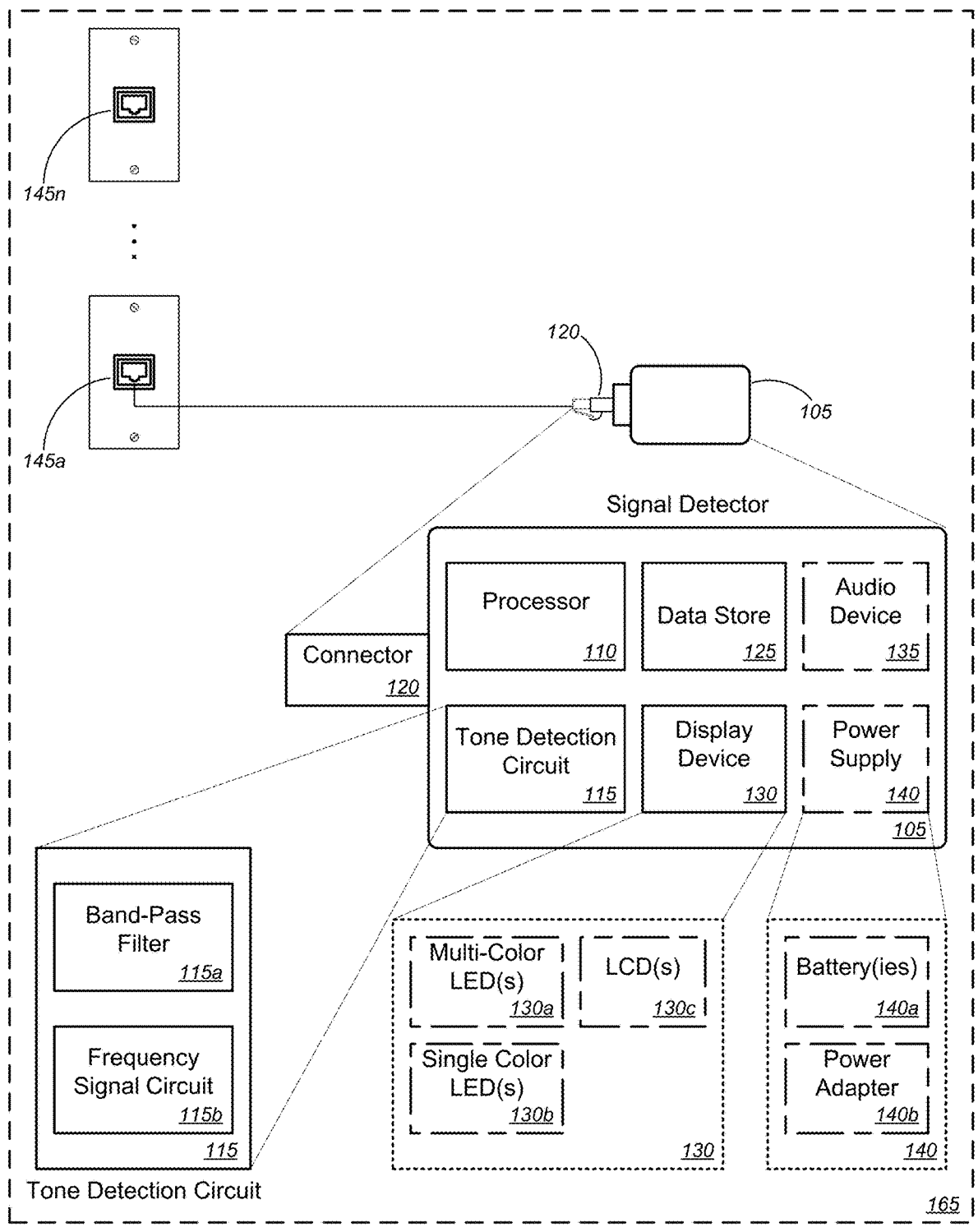
FIG. 2 is a schematic diagram illustrating various non-limiting examples of components of a signal detector that may be used for implementing easy DSL signal detection, in accordance with various embodiments.

In some cases, the processor 110 may include, but is not limited to, at least one of a microprocessor, a nanoprocessor, a microcontroller, a nanocontroller, a single-board computer (e.g., Raspberry Pi series of single-board computers ("SBCs"), or the like), or one or more customized printed circuit board-based processors, and/or the like. In some instances, the tone detection circuit 115 may include, but is not limited to, a band-pass filter 115a and a frequency signal detection circuit 115b, or the like (such as shown in FIG. 2, or the like). In some cases, the connector 120 may include any suitable connector, including, but not limited to, a RJ11 connector (e.g., for DSL or DSL-based network services, etc.), or other communications cable port connector (e.g., Cat5 cable connector for Ethernet-based network communications, or the like), and the like. In some instances, the data store 125 may include, but is not limited to, at least one of a memory chip-based data storage device that may be communicatively coupled to the processor 110 or a memory card-based data storage device (e.g., a secure digital ("SD") card or micro SD card-based data storage device, other multi-media card-based data storage device, or the like), or the like. In some embodiments, the data store 125 may be integrated with the processor 110 within the same microchip or the like, while they may be separate components in other embodiments. According to some embodiments, the processor 105 and the data store 125 may be integrated within tone detection circuit 115. In some cases, the display device 130 may include, without limitation, at least one of one or more multi-colored light emitting diodes ("LEDs") 130a, one or more single-colored LEDs 130b, or a liquid crystal display ("LCD") 130c, and/or the like (such as shown in FIG. 2, or the like). In some instances, the optional audio device 135 may include a speaker or other sound emitting device, or the like. In some cases, the optional power supply 140 may include at least one of one or more batteries 140a or a power adapter 140b, and/or the like (such as shown in FIG. 2, or the like).

System 100 may further comprise one or more network service ports 145a-145n (collectively, "network service ports 145" or "ports 145" or the like), a modem 150, and one or more user devices 155a-155n (collectively, "user devices 150" or the like), each or one or more of which may be disposed or located with a room among a plurality of rooms 160a-160n (collectively, "rooms 160" or the like) of a customer premises 165. In some embodiments, the network service ports 145 may each include, without limitation, a RJ11 port (e.g., for DSL or xDSL-based network services, etc.), or other communications cable port (e.g., Cat5 cable port for Ethernet-based network communications, or the like), and the like, and may, in some instances, be wall-mounted, such as shown, e.g., in FIGS. 2 and 3A-3F by the wall-mounted face plate-based network service ports 145. In some cases, the user devices 155 may include, but are not limited to, at least one of a laptop computer, a desktop computer, a server computer, a network adapter, a network communications-based television, a network communications-based media player, a set-top box, or a wired-to-wireless network relay system, and/or the like. In some instances, customer premises 165 may include, but is not limited to, one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

System 100 may further comprise a minimum point of entry ("MPOE") device 170 (also referred to as "a network interface device ("NID")," "a demarcation point," or the like), a digital subscriber line access multiplexer ("DSLAM") 175, and one or more network(s) 180, and/or the like. MPOE 170 may refer to a network service terminal that is located on an exterior wall of the customer premises 165 that is accessible by a technician to provide communications links to the DSLAM 175, without the technician being required to enter the customer premises.

According to some embodiments, network(s) 180 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 180 may include an access network of the service provider (e.g., an Internet service provider ("ISP")). In another embodiment, the network(s) 180 may include a core network of the service provider and/or the Internet.

In operation, after a connector (e.g., connector 120, or the like) of a signal detector (e.g., signal detector 105, or the like) has been inserted into a network service port (e.g., one of network service ports 145a-145n, or the like), a processor (e.g., processor 110, or the like) of the signal detector may determine whether a pilot tone is present on at least one signal wire communicatively coupled to the network service port, the pilot tone being indicative of network service being ready for provision via the at least one signal wire. Based on a determination that a pilot tone is present on at least one signal wire communicatively coupled to the network service port, the processor of the signal detector may cause a display device (e.g., display device 130, or the like) to indicate to a user (e.g., the customer or a technician, or the like) that the network service port is ready to provide the network service.

In some embodiments, determining whether the pilot tone is present on the at least one signal wire communicatively coupled to the network service port may comprise: a tone detection circuit (e.g., tone detection circuit 115, or the like) of the signal detector determining whether a pilot tone is present on at least one signal wire communicatively coupled to the network service port. Based on a determination that a pilot tone is present on at least one signal wire communicatively coupled to the network service port, the tone detection circuit may send a first signal to the processor indicating that the pilot tone is present on the at least one signal wire. Based on a determination that a pilot tone is not present on any signal wire communicatively coupled to the network service port, the tone detection circuit may send a second signal to the processor indicating that the pilot tone is not present on any signal wire communicatively coupled to the network service port. In some instances, the tone detection circuit may be configured to detect a signal having a 138 kHz center frequency (also referred to as "tone 32" or the like). In some cases, the tone detection circuit may include a band-pass filter having a 3 dB passband roll-off on either side of the 138 kHz center frequency (in some cases referred to as a "guard band" or the like). The 3 dB passband roll-off is used to limit the amount of noise detected by the tone detection circuit.

According to some embodiments, the network service may be a digital subscriber line ("DSL") service, the connector may be a DSL-compatible connector, and the network service port may be a DSL-compatible port. In such cases, the pilot tone may comprise a 138 kHz center-frequency signal.

In some embodiments, the display device may include, without limitation, a multi-colored light emitting diode ("LED"). In some cases, a first color of the multi-colored LED may indicate that the network service port is ready to provide the network service, while a second color of the multi-colored LED may indicate that the network service is not provided through the network service port, where the second color may be different from the first color. In some instances, an optional third color of the multi-colored LED may indicate that the signal detector is powered on. In some cases, the third color and the second color may be the same color, while in other cases, the third color may be different from each of the second color and the first color.

Alternatively, or additionally, the display device may include, but is not limited to, one or more single-colored LEDs. In some instances, a first single-colored LED, when turned on, may indicate that the network service port is ready to provide the network service. In some cases, a second single-colored LED, when turned on, may indicate that the network service is not provided through the network service port. In some instances, a color of the second single-colored LED may be different from a color of the first single-colored LED. In some cases, an optional third single-colored LED, when turned on, may indicate that the signal detector is powered on. In some instances, a color of the third single-colored LED may be different from each of the color of the second single-colored LED and the color of the first single-colored LED. Alternatively, the color of the second single-colored LED may be indicative of both the signal detector being powered on and network service not being provided (e.g., such as when the signal detector is not inserted or plugged into the network service port, or when no pilot tone is present even when the signal detector is inserted or plugged into the network service port, or the like).

Alternatively, or additionally, the display device may include, without limitation, a liquid crystal display ("LCD"). In some cases, the LCD may display at least one of a first character (e.g., "Y" or "y" for yes, "P" or "p" for pilot tone, "T" or "t" for tone, or the like, each indicating presence of a pilot tone), a first symbol (e.g., a checkmark, or the like, indicating presence of a pilot tone), a first word (e.g., "Yes" or "yes" for yes, "Pilot" or "pilot" for pilot tone, "Tone" or "tone" for tone, "OK" for okay, or the like, each indicating presence of a pilot tone), or a first icon (e.g., a globe icon, a cloud icon, a link icon, or the like, each indicating presence of a pilot tone) to indicate that the network service port is ready to provide the network service, while the LCD may display at least one of a second character (e.g., "N" or "n" for no, "X" or "x" for no connection, or the like, each indicating absence of a pilot tone), a second symbol (e.g., "X" or "x" for no connection, or the like, each indicating absence of a pilot tone), a second word (e.g., "No" or "no" for no, or the like, each indicating absence of a pilot tone), or a second icon (e.g., a crossed-out globe icon, a crossed-out cloud icon, a crossed-out link icon, or the like, each indicating absence of a pilot tone) to indicate that the network service is not provided through the network service port. In some instances, each of the first character, the first symbol, the first word, and the first icon may be different from corresponding one of the second character, the second symbol, the second word, and the second icon.

Once the network service port among the plurality of network service ports 145a-145n has been identified as being ready to provide network service (based on presence of the pilot tone indicative of such), the user may install or connect a modem (e.g., modem 150, or the like). The modem may then be trained up or connected, via appropriate handshake sequence with DSLAM (e.g., DSLAM 175, or the like) or other network equipment in the network (e.g., network(s) 180, or the like) via a MPOE (e.g., MPOE 170, or the like). Once trained up or connected, the modem may be communicatively coupled (via either wired or wireless connection) to one or more user devices (e.g., user devices 155a-155n, or the like).

Processor 110, tone detection circuit 115, connector 120, data store 125, display device 130, optional audio device 135, and optional power supply 140 may be integrated within a single, compact, handheld form factor of the signal detector that is low-cost, "plug-and-play" ready (i.e., may function immediately upon insertion in a compatible network service port, provided it has sufficient power), and easy to pick up and use (compared with costly and/or cumbersome devices whose results require interpretation by a user, such as oscilloscopes, professional technician's instruments, etc.). Accordingly, the signal detector 105 may be provided to a customer along with the modem or other network equipment, with instructions for the customer to personally identify the correct network service port to connect or install the modem 150, without the need for a technician to enter the customer premises 165 to install the modem. In this manner, the costs of the service may be reduced, as truck rolls for installing the modem within the customer premises may be obviated, as well as the need for expensive equipment for identifying the network service port for installing the modem (regardless of whether the customer or the technician is installing the modem).

These and other functions of the system 100 (and its components) are described in greater detail below with respect to FIGS. 2-4.

FIG. 2 is a schematic diagram illustrating various non-limiting examples 200 of components of a signal detector that may be used for implementing easy DSL signal detection, in accordance with various embodiments.

With reference to FIG. 2, signal detector 105 may be configured to be inserted (or plugged) into a network service port 145 (in this case, network service port 145a) among a plurality of network service ports 145a-145n that may be disposed or located within customer premises 165. Signal detector 105 may include, without limitation, a processor 110, a tone detection circuit 115, a connector 120, a data store 125, a display device 130, an audio device 135 (optional), and a power supply 140 (optional). As shown in FIG. 2, processor 110, tone detection circuit 115, connector 120, data store 125, display device 130, optional audio device 135, and optional power supply 140 may be integrated within a single, compact, handheld form factor of the signal detector 105.

In some instances, the tone detection circuit 115 may include, but is not limited to, a band-pass filter 115a and a frequency signal detection circuit 115b, or the like. In some cases, the connector 120 may include any suitable connector, including, but not limited to, a RJ11 connector (e.g., for DSL or DSL-based network services, etc.), or other communications cable port connector (e.g., Cat5 cable connector for Ethernet-based network communications, or the like), and the like. In some instances, the display device 130 may include, without limitation, at least one of one or more multi-colored light emitting diodes ("LEDs") 130a, one or more single-colored LEDs 130b, or a liquid crystal display ("LCD") 130c, and/or the like. In some cases, the optional power supply 140 may include at least one of one or more batteries 140a (including, but not limited to, one or more cylindrical dry cell batteries (e.g., AA-type batteries, AAA-type batteries, or the like), one or more standard 9-volt batteries, one or more coin cell batteries (also referred to as "button cell" or "watch battery" or the like; e.g., CR2032 batteries, SR516 batteries, LR1154 batteries, or the like), etc.) or a power adapter 140b, and/or the like. In some embodiments, the signal detected by the signal detector 105 via the network service port 145 into which its connector 120 is inserted (or plugged) may provide sufficient power that may be converted to power the processor 110, tone detection circuit 115, and the display device 130 (and in some cases, the audio device 135, if present), and thus the power supply 140 may not be necessary.

For installation of a modem (e.g., modem 150 of FIG. 1, or the like), a user (i.e., either a customer or a technician, or the like) may use the signal detector 105 to determine which network service port is connected to the DSLAM (e.g., DSLAM 175 of FIG. 1, or the like) via the MPOE (e.g., MPOE 170 of FIG. 1, or the like), and thus provided with Internet service (e.g., via network(s) 180 of FIG. 1, or the like). Because either the MPOE 170 (as accessed from the exterior of the customer premises 165 by the technician) may have more than one network service adapter or network service port or the one or more network service adapters or one or more network service ports in the MPOE 170 may connect to only one network service port 145 that is disposed within the customer premises 165, it may not be clear or obvious which network service port 145 the modem should be plugged into to connect with the DSLAM (and thus to connect with the Internet service). The signal detector 105, when inserted or plugged into a network service port 145, may be used to identify whether the network service port 145 into which it is inserted (or plugged) is transmitting an appropriate pilot signal indicative of network service connection.

In the case that the network service is a digital subscriber line ("DSL") service, the connector 120 may be a DSL-compatible connector, and the network service ports 145a-145n may each be a DSL-compatible port. In such cases, the pilot tone may comprise a 138 kHz center-frequency signal. The band-pass filter 115a, which may be either a fixed frequency filter or a variable frequency filter and/or may have either a fixed passband roll-off or a variable passband roll-off on either side of the filter's center frequency, may be configured, in some cases, to have a center frequency of 138 kHz with a 3 dB passband roll-off on either side of the 138 kHz center frequency guard band. The frequency signal circuit 115b, which is communicatively coupled to the output of the band-pass filter 115a, will then detect a signal only if the signal falls within the passband of the band-pass filter 115a (in this case, 138 kHz with 3 dB roll-off, or the like).

If the frequency signal circuit 115b detects a signal (i.e., the signal indicative of the pilot tone), then the processor 110 may cause the display device 130 to display to the user a first visual indication that the pilot tone has been detected (i.e., that the network service port 145 is ready to provide network service). In some embodiments, in addition to the first visual indication, the processor 110 may also cause the (optional) audio device 135 to emit a first sound or audible tone (i.e., provide a first audible indication) of the same. However, if the frequency signal circuit 115b does not detect a signal (i.e., the signal indicative of the pilot tone), then the processor 110 may cause the display device 130 to display to the user a second visual indication (which is different from the first visual indication) that the pilot tone has not been detected (i.e., that the network service port 145 is not connected to Internet service, or the like). In some embodiments, in addition to the second visual indication, the processor 110 may also cause the (optional) audio device 135 to emit a second sound or audible tone (i.e., provide a second audible indication, which is different from the second audible indication) of the same. According to some embodiments, the signal detector 105 may default to displaying the second visual indication (regardless of whether the connector 120 of the signal detector 105 is inserted (or plugged) into any network service port 145), and will change its visual indication to the first visual indication only when the connector 120 is inserted (or plugged) into a network service port 145 that is transmitting the pilot signal. FIGS. 3A-3F depict different embodiments of display devices (namely, multi-color LED(s) 130a (FIGS. 3A and 3B), single color LED(s) 130b (FIGS. 3C and 3D), and LCD(s) 130c (FIGS. 3E and 3F)) when the pilot tone has been detected (FIGS. 3A, 3C, and 3E) and when the pilot tone has not been detected (FIGS. 3B, 3D, and 3F).

Signal detector 105, processor 110, tone detection circuit 115 (and its components), connector 120, data store 125, display device 130 (and its components), optional audio device 135, optional power supply 140 (and its components), network service ports 145a-145n, and customer premises 165 of FIG. 2 may otherwise be similar, if not identical, to corresponding signal detector 105, processor 110, tone detection circuit 115 (and its components), connector 120, data store 125, display device 130 (and its components), optional audio device 135, optional power supply 140 (and its components), network service ports 145a-145n, and customer premises 165 of system 100 of FIG. 1, and description of these components in system 100 of FIG. 1 may similarly apply to the corresponding components in FIG. 2.

FIGS. 3A-3F (collectively, "FIG. 3") are schematic diagrams illustrating various non-limiting examples 300, 300', and 300" of visual indications provided by non-limiting examples of display devices of a signal detector that may be used for implementing easy DSL signal detection, in accordance with various embodiments.

Figure 3A:
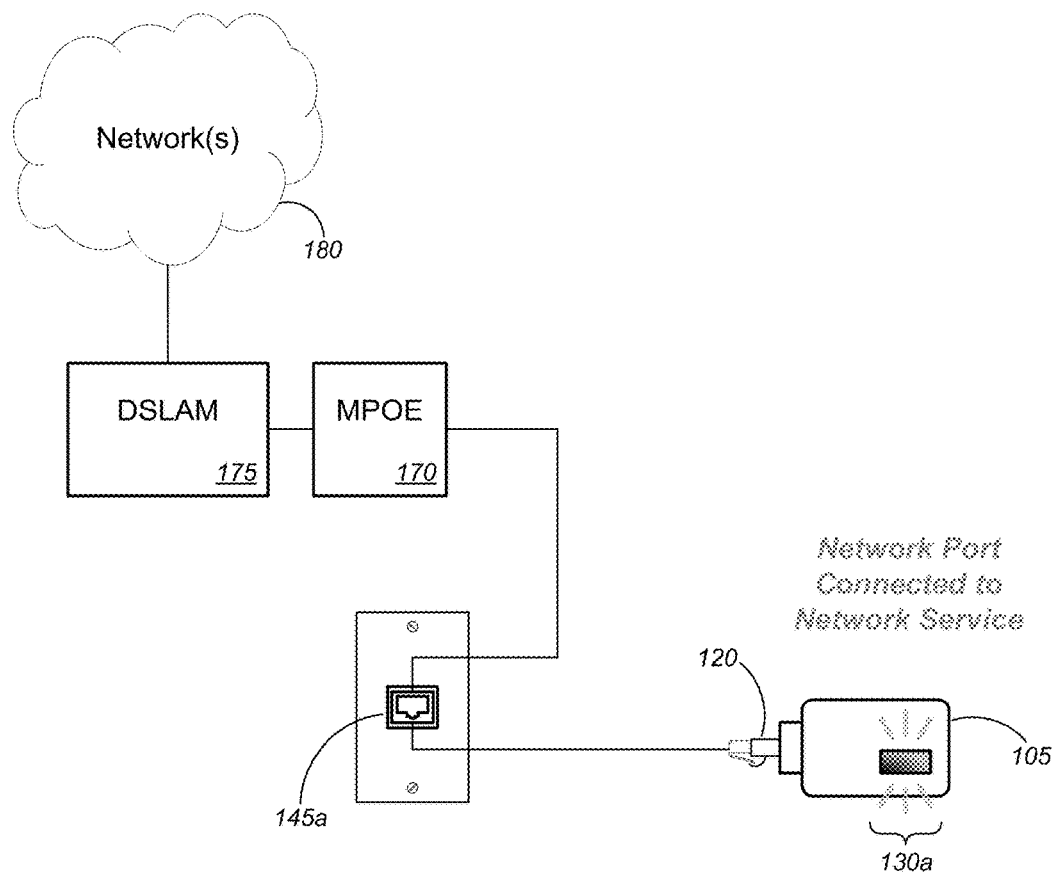
FIGS. 3A-3F are schematic diagrams illustrating various non-limiting examples of visual indications provided by non-limiting examples of display devices of a signal detector that may be used for implementing easy DSL signal detection, in accordance with various embodiments.
Figure 3B:
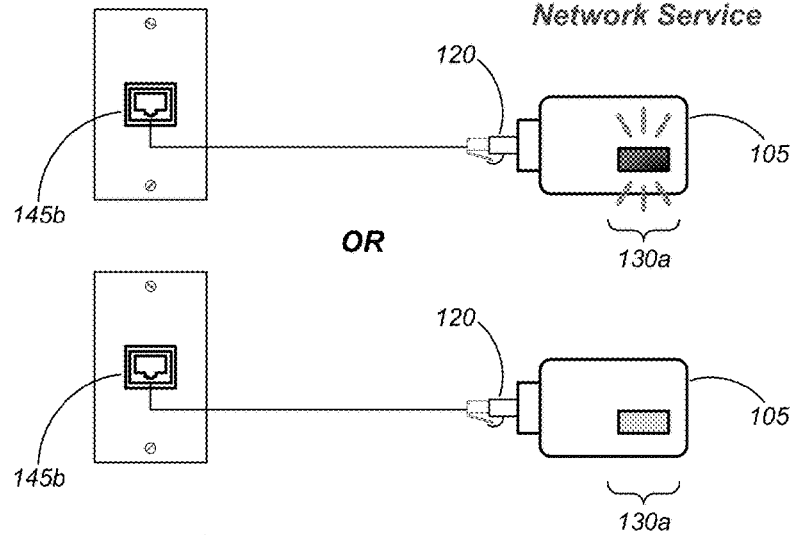

Referring to the non-limiting example 300 of FIG. 3A, in the case that the network service port (in this case, network service port 145a) is connected to MPOE 170, which is connected to network(s) 180 via DSLAM 175, the signal detector 105—when its connector 120 is inserted (or plugged) into the network service port (i.e., network service port 145a) and when its tone detection circuit (shown in FIGS. 1 and 2) detects a pilot tone (i.e., 138 kHz with 3 dB roll-off in the case of DSL network service, or the like)—may cause its display device 130 in the form of a multi-color light emitting diode ("LED") 130a to provide a first visual indication (i.e., to provide a solid light or blinking light in a first color (e.g., green, blue, or yellow, or the like (shown as light gray in gray-scale depiction))) to indicate that the network service port (i.e., network service port 145a) is connected to network service. Although not shown in FIG. 3A, the signal detector 105 may also cause an audio device (e.g., optional audio device 135 of FIGS. 1 and 2, or the like), when present, to emit a first audible indication (i.e., to provide a first sound or tone) to indicate the same.

However, in the case that the network service port (in this case, network service port 145b) is not connected to MPOE 170, and thus is not connected to network(s) 180 via DSLAM 175 (FIG. 3B), the signal detector 105—when its connector 120 is inserted (or plugged) into the network service port (i.e., network service port 145b) and when its tone detection circuit does not detect the pilot tone (i.e., 138 kHz with 3 dB roll-off in the case of DSL network service, or the like)—may cause its display device 130 in the form of the multi-color LED 130a to provide a second visual indication (i.e., to provide a solid light or blinking light in a second color (e.g., red, purple, or orange, or the like (shown as dark gray in gray-scale depiction)) that is different from the first color) to indicate that the network port (i.e., network service port 145b) is not connected to network service. Alternatively, instead of providing a second visual indication as a second color, when the tone detection circuit does not detect the pilot tone, the multi-color LED 130a may simply be left (or turned) off (i.e., "no light" state, or the like). Although not shown in FIG. 3B, the signal detector 105 may also cause the audio device, when present, to emit a second audible indication (i.e., to provide a second sound or tone that is different from the first sound or tone) to indicate the same.

Figure 3C:
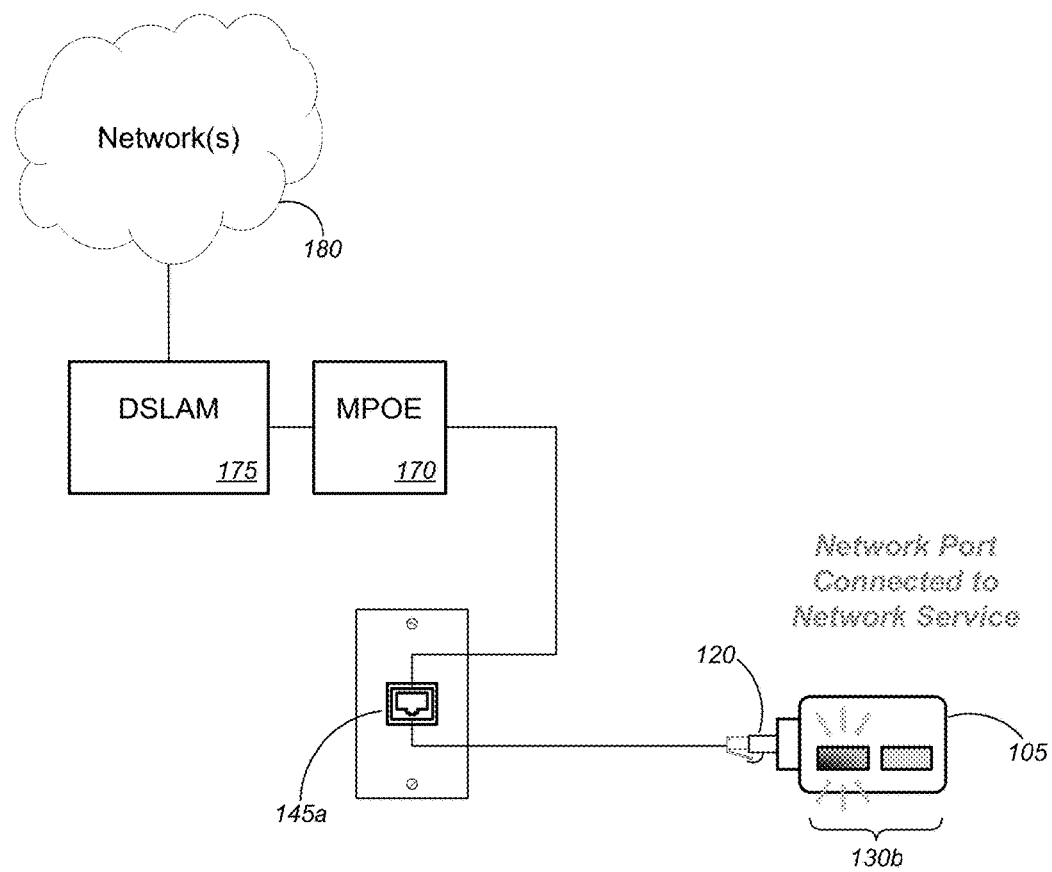
Figure 3D:
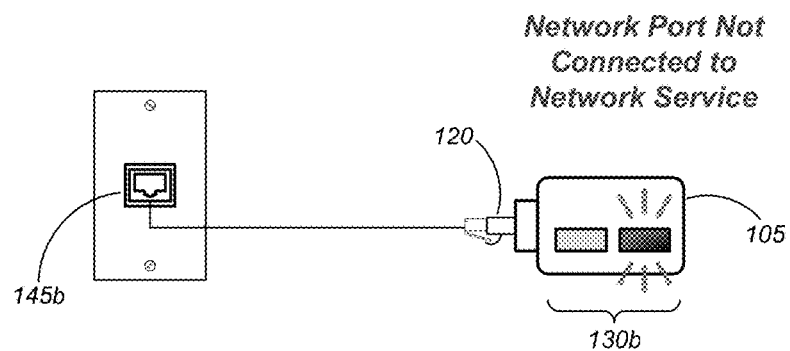

Turning to the non-limiting example 300' of FIG. 3C, in the case that the network service port (in this case, network service port 145a) is connected to MPOE 170, which is connected to network(s) 180 via DSLAM 175, the signal detector 105—when its connector 120 is inserted (or plugged) into the network service port (i.e., network service port 145a) and when its tone detection circuit (shown in FIGS. 1 and 2) detects a pilot tone (i.e., 138 kHz with 3 dB roll-off in the case of DSL network service, or the like)—may cause its display device 130 in the form of a first single color LED 130b to provide a first visual indication (i.e., to provide a solid light or blinking light in a first color (e.g., green, blue, or yellow, or the like (shown as light gray in gray-scale depiction))) to indicate that the network service port (i.e., network service port 145a) is connected to network service. Although not shown in FIG. 3C, the signal detector 105 may also cause an audio device (e.g., optional audio device 135 of FIGS. 1 and 2, or the like), when present, to emit a first audible indication (i.e., to provide a first sound or tone) to indicate the same.

However, in the case that the network service port (in this case, network service port 145b) is not connected to MPOE 170, and thus is not connected to network(s) 180 via DSLAM 175 (FIG. 3D), the signal detector 105—when its connector 120 is inserted (or plugged) into the network service port (i.e., network service port 145b) and when its tone detection circuit does not detect the pilot tone (i.e., 138 kHz with 3 dB roll-off in the case of DSL network service, or the like)—may cause its display device 130 in the form of a second single color LED 130b to provide a second visual indication (i.e., to provide a solid light or blinking light in a second color (e.g., red, purple, or orange, or the like (shown as dark gray in gray-scale depiction)) that is different from the first color) to indicate that the network port (i.e., network service port 145b) is not connected to network service. Although not shown in FIG. 3D, the signal detector 105 may also cause the audio device, when present, to emit a second audible indication (i.e., to provide a second sound or tone that is different from the first sound or tone) to indicate the same. In FIGS. 3C and 3D, the second single color LED is in the off state (i.e., "no light" state, or the like) when the first single color LED is in the on state (i.e., when the first single color LED is providing the first visual indication), and vice versa (i.e., when the second single color LED is providing the second visual indication).

Figure 3E:
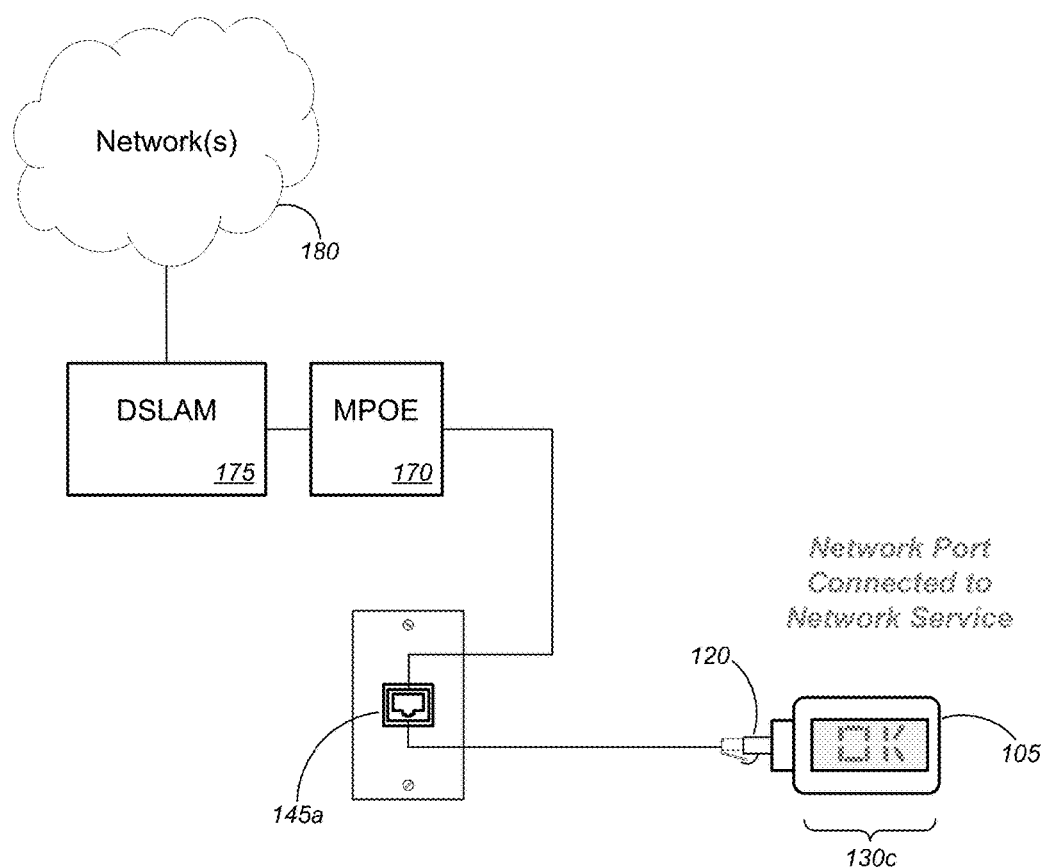
Figure 3F:
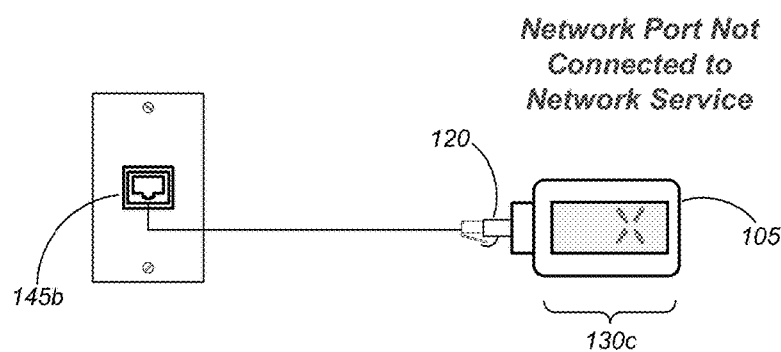

With reference to the non-limiting example 300" of FIG. 3E, in the case that the network service port (in this case, network service port 145a) is connected to MPOE 170, which is connected to network(s) 180 via DSLAM 175, the signal detector 105—when its connector 120 is inserted (or plugged) into the network service port (i.e., network service port 145a) and when its tone detection circuit (shown in FIGS. 1 and 2) detects a pilot tone (i.e., 138 kHz with 3 dB roll-off in the case of DSL network service, or the like)—may cause its display device 130 in the form of a liquid crystal display ("LCD") device 130c to provide a first visual indication [i.e., to display at least one of a first character (e.g., "Y" or "y" for yes, "P" or "p" for pilot tone, "T" or "t" for tone, or the like, each indicating presence of a pilot tone), a first symbol (e.g., a checkmark, or the like, indicating presence of a pilot tone), a first word (e.g., "Yes" or "yes" for yes, "Pilot" or "pilot" for pilot tone, "Tone" or "tone" for tone, "OK" for okay, or the like, each indicating presence of a pilot tone), or a first icon (e.g., a globe icon, a cloud icon, a link icon, or the like, each indicating presence of a pilot tone)] to indicate that the network service port (i.e., network service port 145a) is connected to network service. In this case, "OK" is displayed on the LCD 130c to indicate that the network service port is connected to the network service. Although not shown in FIG. 3E, the signal detector 105 may also cause an audio device (e.g., optional audio device 135 of FIGS. 1 and 2, or the like), when present, to emit a first audible indication (i.e., to provide a first sound or tone) to indicate the same.

However, in the case that the network service port (in this case, network service port 145b) is not connected to MPOE 170, and thus is not connected to network(s) 180 via DSLAM 175 (FIG. 3F), the signal detector 105—when its connector 120 is inserted (or plugged) into the network service port (i.e., network service port 145b) and when its tone detection circuit does not detect the pilot tone (i.e., 138 kHz with 3 dB roll-off in the case of DSL network service, or the like)—may cause its display device 130 in the form of the LCD 130c to provide a second visual indication [i.e., to display at least one of a second character (e.g., "N" or "n" for no, "X" or "x" for no connection, or the like, each indicating absence of a pilot tone), a second symbol (e.g., "X" or "x" for no connection, or the like, each indicating absence of a pilot tone), a second word (e.g., "No" or "no" for no, or the like, each indicating absence of a pilot tone), or a second icon (e.g., a crossed-out globe icon, a crossed-out cloud icon, a crossed-out link icon, or the like, each indicating absence of a pilot tone)] to indicate that the network port (i.e., network service port 145*b*) is not connected to network service. In this case, "X" is displayed on the LCD 130*c* to indicate that the network service port is not connected to the network service. Although not shown in FIG. 3F, the signal detector 105 may also cause the audio device, when present, to emit a second audible indication (i.e., to provide a second sound or tone that is different from the first sound or tone) to indicate the same.

Figure 4A:
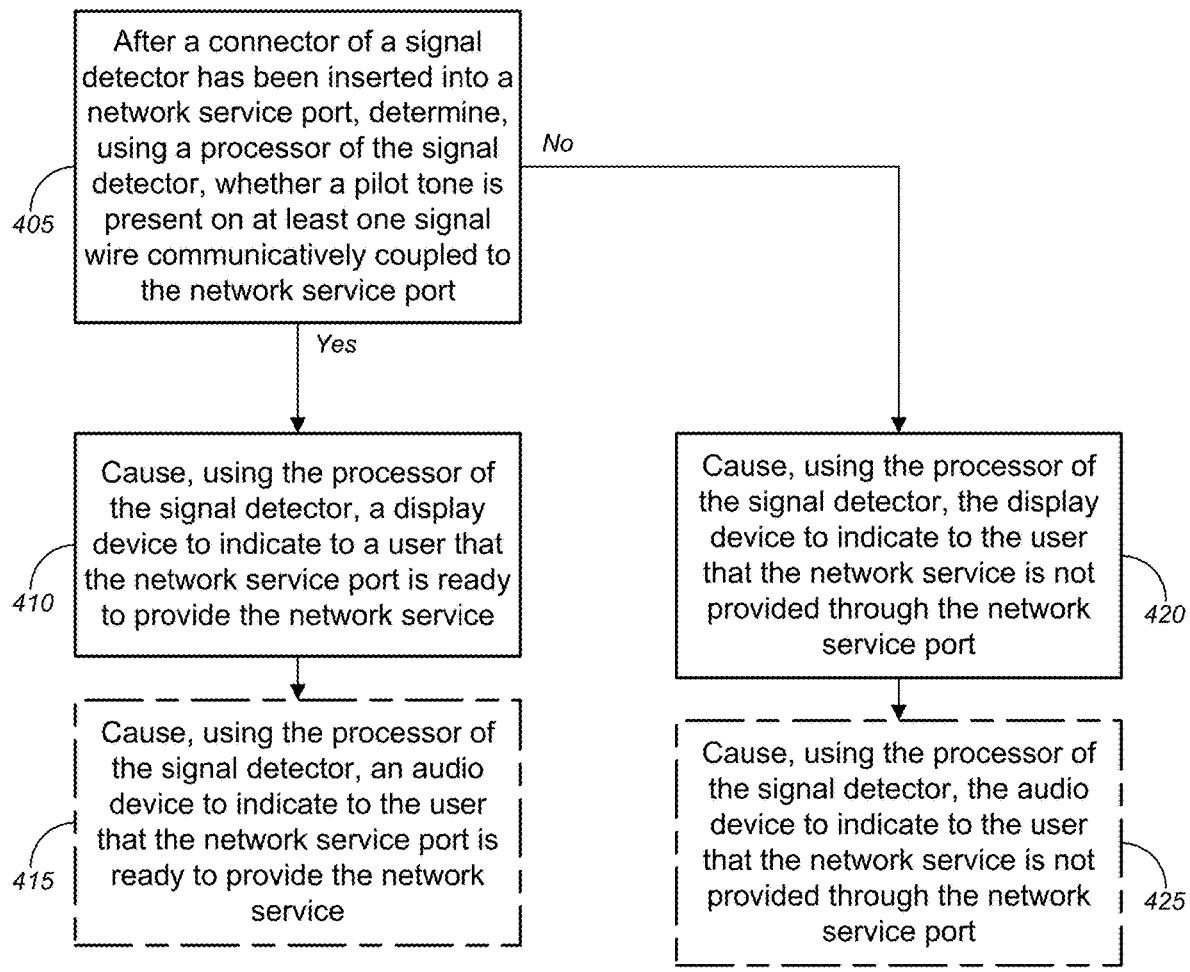
FIGS. 4A and 4B are flow diagrams illustrating a method for implementing easy DSL signal detection, in accordance with various embodiments.
Figure 4B:
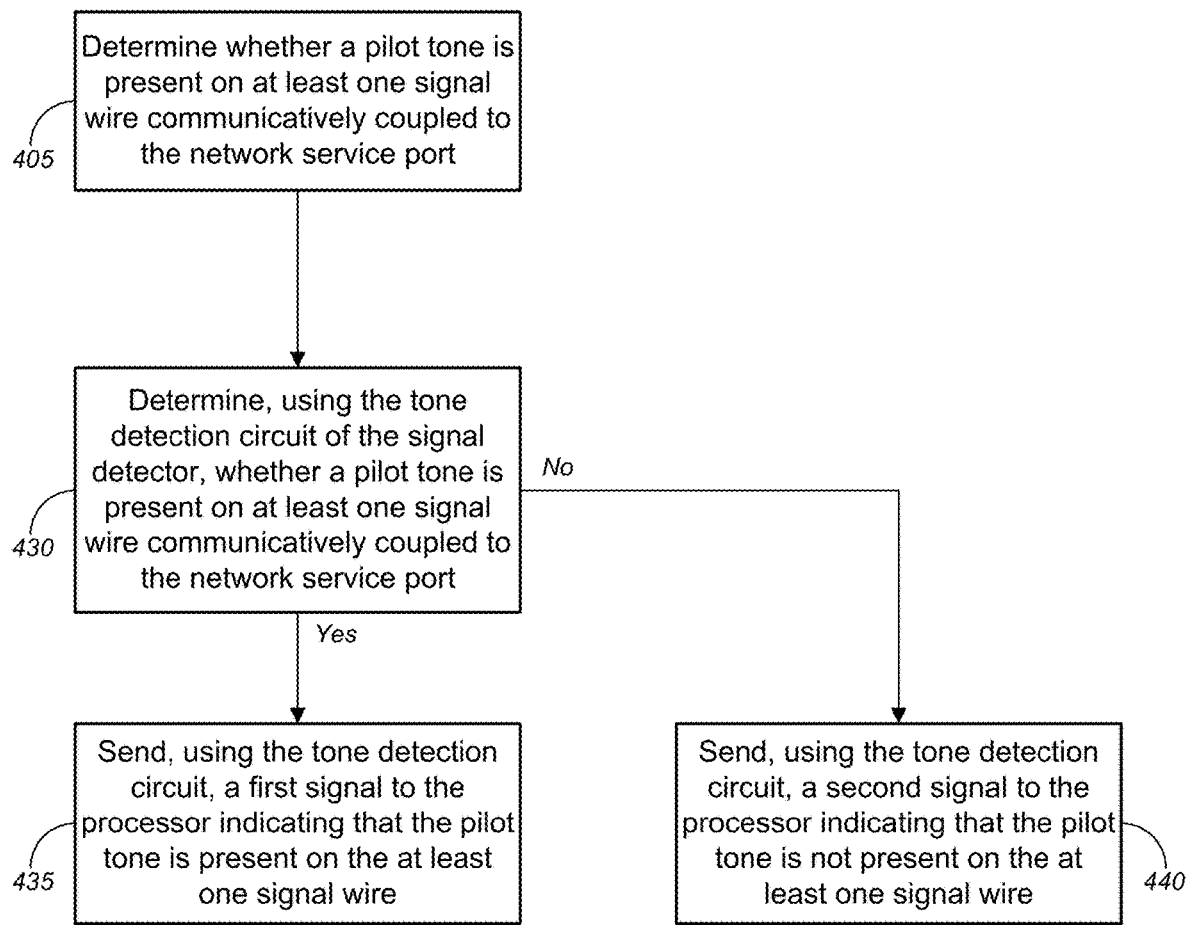

FIGS. 4A and 4B (collectively, "FIG. 4") are flow diagrams illustrating a method 400 for implementing easy DSL signal detection, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', and 300" of FIGS. 1, 2, 3A-3B, 3C-3D, and 3E-3F, respectively (or components thereof), such methods may also be implemented using any suitable hardware (or software) implementation. Similarly, while each of the systems, examples, or embodiments 100, 200, 300, 300', and 300" of FIGS. 1, 2, 3A-3B, 3C-3D, and 3E-3F, respectively (or components thereof), can operate according to the method 400 illustrated by FIG. 4 (e.g., by executing instructions embodied on a computer readable medium), the systems, examples, or embodiments 100, 200, 300, 300', and 300" of FIGS. 1, 2, 3A-3B, 3C-3D, and 3E-3F can each also operate according to other modes of operation and/or perform other suitable procedures.

In the non-limiting embodiment of FIG. 4A, method 400, at block 405, may comprise, after a connector of a signal detector has been inserted into a network service port, determining, using a processor of the signal detector, whether a pilot tone is present on at least one signal wire communicatively coupled to the network service port, the pilot tone being indicative of network service being ready for provision via the at least one signal wire. If so, method 400 may continue onto the process at block 410. If not, method 400 may continue onto the process at block 420.

At block 410, method 400 may comprise, based on a determination that a pilot tone is present on at least one signal wire communicatively coupled to the network service port, causing, using the processor of the signal detector, a display device to indicate to a user [referred to herein as "visual indication"] that the network service port is ready to provide the network service. In some cases, method 400 may further comprise, at optional block 415, in addition to the visual indication, causing, using the processor of the signal detector, an audio device to indicate to the user [referred to herein as "audible indication"] that the network service port is ready to provide the network service. The connector, the processor, and the display device (and the optional audio device) may be integrated within a single, compact, handheld form factor of the signal detector.

Alternatively, at block 420, method 400 may comprise, based on a determination that a pilot tone is not present on any signal wire communicatively coupled to the network service port, causing, using the processor of the signal detector, the display device to indicate to the user (i.e., via visual indication, or the like) that the network service is not provided through the network service port. In some cases, method 400 may further comprise, at optional block 425, in addition to the visual indication, causing, using the processor of the signal detector, the audio device to indicate to the user (i.e., via audible indication, or the like) that the network service is not provided through the network service port.

With reference to FIG. 4B, the signal detector may further comprise a tone detection circuit, which may also be integrated within the single, compact, handheld form factor of the signal detector. In such cases, determining whether the pilot tone is present on the at least one signal wire communicatively coupled to the network service port (at block 405) may comprise: determining, using the tone detection circuit of the signal detector, whether a pilot tone is present on at least one signal wire communicatively coupled to the network service port (block 430). If so, method 400 may continue onto the process at block 435. If not, method 400 may continue onto the process at block 440.

At block 435, method 400 may comprise, based on a determination that a pilot tone is present on at least one signal wire communicatively coupled to the network service port, sending, using the tone detection circuit, a first signal to the processor indicating that the pilot tone is present on the at least one signal wire.

Alternatively, at block 440, method 400 may comprise, based on a determination that a pilot tone is not present on any signal wire communicatively coupled to the network service port, sending, using the tone detection circuit, a second signal to the processor indicating that the pilot tone is not present on any signal wire communicatively coupled to the network service port.

In some instances, the tone detection circuit may be configured to detect a signal having a 138 kHz center frequency. In some cases, the tone detection circuit may comprise a band-pass filter having a 3 dB passband roll-off on either side of the 138 kHz center frequency.

According to some embodiments, the network service may be a digital subscriber line ("DSL") service, the connector may be a DSL-compatible connector, and the network service port may be a DSL-compatible port. In such cases, the pilot tone may comprise a 138 kHz center-frequency signal.

In some embodiments, the display device may comprise a multi-colored light emitting diode ("LED"). In some cases, a first color of the multi-colored LED may indicate that the network service port is ready to provide the network service, while a second color of the multi-colored LED may indicate that the network service is not provided through the network service port, where the second color may be different from the first color. In some instances, a third color of the multi-colored LED may indicate that the signal detector is powered on. In some cases, the third color and the second color may be the same color.

Alternatively, or additionally, the display device may comprise one or more single-colored LEDs. In some instances, a first single-colored LED, when turned on, may indicate that the network service port is ready to provide the network service. In some cases, a second single-colored LED, when turned on, may indicate that the network service is not provided through the network service port. In some instances, a color of the second single-colored LED may be different from a color of the first single-colored LED.

Alternatively, or additionally, the display device may comprise a liquid crystal display ("LCD"). In some cases, the LCD may display at least one of a first character, a first symbol, a first word, or a first icon to indicate that the network service port is ready to provide the network service, while the LCD may display at least one of a second character, a second symbol, a second word, or a second icon to indicate that the network service is not provided through the network service port. In some instances, each of the first character, the first symbol, the first word, and the first icon may be different from corresponding one of the second character, the second symbol, the second word, and the second icon.

Exemplary System and Hardware Implementation

Figure 5:
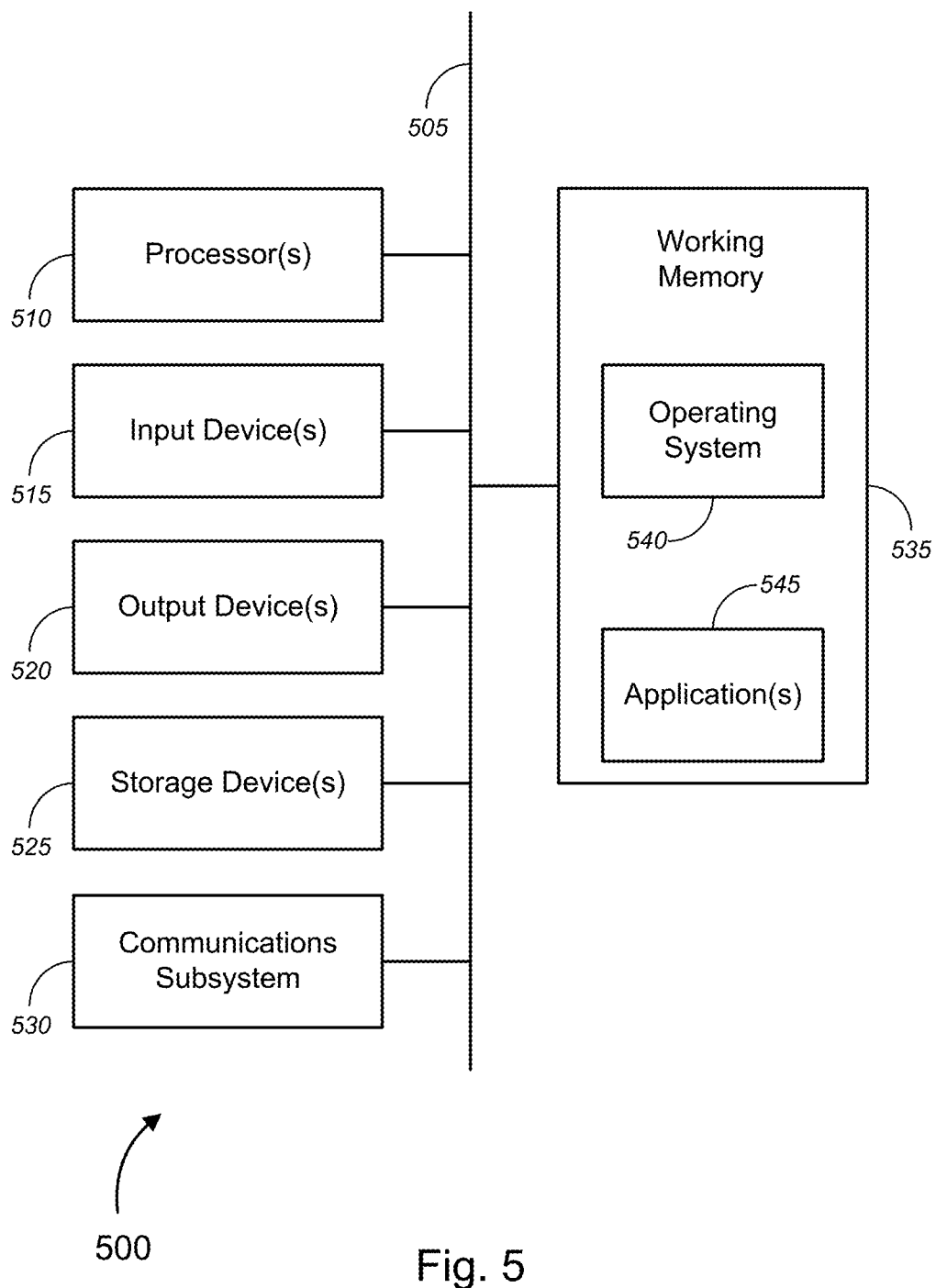
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., signal detector 105 and user devices 150a-150n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., signal detector 105 and user devices 150a-150n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
after a connector of a signal detector has been inserted into a network service port, determining, using the processor of the signal detector, whether a pilot tone is present on the at least one signal wire communicatively coupled to the network service port in response to the transmitted first tone, the pilot tone being indicative of network service being ready for provision via the at least one signal wire; and
based on a determination that a pilot tone is present on at least one signal wire communicatively coupled to the network service port, causing, using the processor of the signal detector, a display device to indicate to a user that the network service port is ready to provide the network service, wherein the connector, the processor, and the display device are integrated within a single, compact, handheld form factor of the signal detector,
wherein the signal detector further comprises a tone detection circuit, wherein the tone detection circuit is also integrated within the single, compact, handheld form factor of the signal detector, wherein determining whether the pilot tone is present on the at least one signal wire communicatively coupled to the network service port comprises:
determining, using the tone detection circuit of the signal detector, whether a pilot tone is present on at least one signal wire communicatively coupled to the network service port; and
based on a determination that a pilot tone is present on at least one signal wire communicatively coupled to the network service port, sending, using the tone detection circuit, a signal to the processor indicating that the pilot tone is present on the at least one signal wire,
wherein the processor is integrated within the tone detection circuit.

2. The method of claim 1, wherein the tone detection circuit is configured to detect a signal having a 138 kHz center frequency, wherein the tone detection circuit comprises a band-pass filter having a 3 dB passband roll-off on either side of the 138 kHz center frequency.

3. The method of claim 1, wherein the network service is a digital subscriber line ("DSL") service, the connector is a DSL-compatible connector, and the network service port is a DSL-compatible port, wherein the pilot tone comprises a 138 kHz center-frequency signal.

4. The method of claim 1, wherein the display device comprises a multi-colored light emitting diode ("LED"), wherein a first color of the multi-colored LED indicates that the network service port is ready to provide the network service, wherein a second color of the multi-colored LED indicates that the network service is not provided through the network service port, wherein the second color is different from the first color.

5. The method of claim 4, wherein a third color of the multi-colored LED indicates that the signal detector is powered on.

6. The method of claim 5, wherein the third color and the second color are the same color.

7. The method of claim 1, wherein the display device comprises one or more single-colored LEDs, wherein a first single-colored LED, when turned on, indicates that the network service port is ready to provide the network service.

8. The method of claim 7, wherein a second single-colored LED, when turned on, indicates that the network service is not provided through the network service port, wherein a color of the second single-colored LED is different from a color of the first single-colored LED.

9. The method of claim 1, wherein the display device comprises a liquid crystal display ("LCD"), wherein the LCD displays at least one of a first character, a first symbol, a first word, or a first icon to indicate that the network service port is ready to provide the network service, wherein the LCD displays at least one of a second character, a second symbol, a second word, or a second icon to indicate that the network service is not provided through the network service port, wherein each of the first character, the first symbol, the first word, and the first icon is different from corresponding one of the second character, the second symbol, the second word, and the second icon.

10. A signal detector, comprising:
   a connector;
   a display device;
   a processor;
   a non-transitory computer readable medium communicatively coupled to the processor, the non-transitory computer readable medium having stored thereon computer software comprising a set of instructions that, when executed by the processor, causes the signal detector to:
      after the connector of the signal detector has been inserted into a network service port, transmit a first tone over at least one signal wire communicatively coupled to the network service port, and determine whether a pilot tone is present on the at least one signal wire communicatively coupled to the network service port in response to the transmitted first tone, the pilot tone being indicative of network service being ready for provision via the at least one signal wire; and
      based on a determination that a pilot tone is present on at least one signal wire communicatively coupled to the network service port, cause the display device to indicate to a user that the network service port is ready to provide the network service, wherein the connector, the processor, the display device, and the non-transitory computer readable medium are integrated within a single, compact, handheld form factor of the signal detector; and
   a tone detection circuit, wherein the tone detection circuit is also integrated within the single, compact, handheld form factor of the signal detector;
   wherein determining whether the pilot tone is present on the at least one signal wire communicatively coupled to the network service port comprises:
      determining, using the tone detection circuit, whether a pilot tone is present on at least one signal wire communicatively coupled to the network service port; and
      based on a determination that a pilot tone is present on at least one signal wire communicatively coupled to the network service port, sending, using the tone detection circuit, a signal to the processor indicating that the pilot tone is present on the at least one signal wire,
   wherein the processor is integrated within the tone detection circuit.

11. The signal detector of claim 10, wherein the tone detection circuit is configured to detect a signal having a 138 kHz center frequency, wherein the tone detection circuit comprises a band-pass filter having a 3 dB passband roll-off on either side of the 138 kHz center frequency.

12. The signal detector of claim 10, wherein the network service is a digital subscriber line ("DSL") service, the connector is a DSL-compatible connector, and the network service port is a DSL-compatible port, wherein the pilot tone comprises a 138 kHz center-frequency signal.

13. The signal detector of claim 10, wherein the display device comprises a multi-colored light emitting diode ("LED"), wherein a first color of the multi-colored LED indicates that the network service port is ready to provide the network service, wherein a second color of the multi-colored LED indicates that the network service is not provided through the network service port, wherein the second color is different from the first color, wherein a third color of the multi-colored LED indicates that the signal detector is powered on.

14. The signal detector of claim 10, wherein the display device comprises one or more single-colored LEDs, wherein a first single-colored LED, when turned on, indicates that the network service port is ready to provide the network service.

15. The signal detector of claim 14, wherein a second single-colored LED, when turned on, indicates that the network service is not provided through the network service port, wherein a color of the second single-colored LED is different from a color of the first single-colored LED.

16. The signal detector of claim 10, wherein the display device comprises a liquid crystal display ("LCD"), wherein the LCD displays at least one of a first character, a first symbol, a first word, or a first icon to indicate that the network service port is ready to provide the network service, wherein the LCD displays at least one of a second character, a second symbol, a second word, or a second icon to indicate that the network service is not provided through the network service port, wherein each of the first character, the first symbol, the first word, and the first icon is different from corresponding one of the second character, the second symbol, the second word, and the second icon.

* * * * *